United States Patent
Glover et al.

(10) Patent No.: US 10,677,887 B2
(45) Date of Patent: Jun. 9, 2020

(54) APPARATUS AND METHOD FOR AUTOMATICALLY ORIENTING A CAMERA AT A TARGET

(71) Applicant: H4 Engineering, Inc., San Antonio, TX (US)

(72) Inventors: Gordon Jason Glover, Carlsbad, CA (US); Christopher T. Boyle, San Antonio, TX (US)

(73) Assignee: H4 Engineering, Inc., San Antonio, TX (US)

( * ) Notice: Subject to any disclaimer, the term of this patent is extended or adjusted under 35 U.S.C. 154(b) by 0 days.

(21) Appl. No.: 16/099,991

(22) PCT Filed: May 11, 2017

(86) PCT No.: PCT/US2017/032248
§ 371 (c)(1),
(2) Date: Nov. 8, 2018

(87) PCT Pub. No.: WO2017/197174
PCT Pub. Date: Nov. 16, 2017

(65) Prior Publication Data
US 2019/0137597 A1 May 9, 2019

Related U.S. Application Data

(60) Provisional application No. 62/334,997, filed on May 11, 2016.

(51) Int. Cl.
*G01S 5/14* (2006.01)
*G01S 3/02* (2006.01)
(Continued)

(52) U.S. Cl.
CPC .............. *G01S 5/14* (2013.01); *G01S 1/00* (2013.01); *G01S 3/02* (2013.01); *G01S 5/0221* (2013.01);
(Continued)

(58) Field of Classification Search
None
See application file for complete search history.

(56) References Cited

U.S. PATENT DOCUMENTS 6,075,482 A 6/2000 Fukushima
6,323,817 B1 11/2001 Ramanujam et al.
(Continued)

FOREIGN PATENT DOCUMENTS

KR 20100018363 A 2/2010

OTHER PUBLICATIONS

DECAWAVE LTD., EVK1000 User Manual (Version 1.07), 2014.
(Continued)

*Primary Examiner* — Reza Aghevli
(74) *Attorney, Agent, or Firm* — Volk & McElroy, LLP; Michael D. Volk, Jr.

(57) ABSTRACT

Current indoor tracking methods are inadequate to accurately and reliably point a pointer or camera at an object or a person doing an activity. An apparatus and method are provided for cooperative tracking that is operable both indoors and outdoors. The system works using ranging technology without the need for placing radiation sources and/or sensors in set locations around the location where tracking takes place. The apparatus and method may be used for automatic filming, allowing free movement of both the subject of the filming and that of the camera with a compact design, and providing easy setup at any location.

15 Claims, 7 Drawing Sheets

(51) Int. Cl.
*G01S 19/49* (2010.01)
*G01S 1/00* (2006.01)
*H04N 5/32* (2006.01)
*G01S 19/46* (2010.01)
*G06T 7/20* (2017.01)
*G06K 9/00* (2006.01)
*H04N 5/232* (2006.01)
*G01S 5/02* (2010.01)

(52) U.S. Cl.
CPC ............... *G01S 19/46* (2013.01); *G01S 19/49* (2013.01); *G06T 7/20* (2013.01); *H04N 5/23299* (2018.08); *G06K 9/00624* (2013.01); *H04N 5/23296* (2013.01)

(56) References Cited

U.S. PATENT DOCUMENTS

| | | | |
|---|---|---|---|
| 6,433,736 B1 | 8/2002 | Timothy et al. | |
| 6,618,008 B1 | 9/2003 | Scholz | |
| 8,334,775 B2* | 12/2012 | Tapp | G08B 13/19697 235/375 |
| D684,210 S | 6/2013 | Boyle et al. | |
| D703,719 S | 4/2014 | Boyle et al. | |
| 8,704,904 B2 | 4/2014 | Boyle et al. | |
| D704,762 S | 5/2014 | Boyle et al. | |
| 8,749,634 B2 | 6/2014 | Taylor et al. | |
| 8,812,139 B2 | 8/2014 | Liao | |
| D714,374 S | 9/2014 | Sammons et al. | |
| 8,836,508 B2 | 9/2014 | Taylor et al. | |
| D726,808 S | 4/2015 | Sammons et al. | |
| 9,007,476 B2 | 4/2015 | Glover | |
| 9,160,899 B1* | 10/2015 | Boyle | G06F 3/033 |
| 9,253,376 B2 | 2/2016 | Boyle et al. | |
| 9,270,933 B1* | 2/2016 | Jiang | H04N 7/144 |
| D750,693 S | 3/2016 | Sammons et al. | |
| 9,294,669 B2 | 3/2016 | Glover | |
| 9,313,394 B2 | 4/2016 | Boyle et al. | |
| 9,456,174 B2 | 9/2016 | Boyle et al. | |
| 9,565,349 B2 | 2/2017 | Taylor et al. | |
| 9,578,365 B2 | 2/2017 | Boyle et al. | |
| 9,628,675 B2* | 4/2017 | Zhou | H04N 5/4403 |
| 9,723,192 B1 | 8/2017 | Sammons et al. | |
| 9,730,330 B1 | 8/2017 | Boyle et al. | |
| 9,800,769 B2 | 10/2017 | Taylor et al. | |
| 9,848,172 B2* | 12/2017 | DeAngelis | A63B 24/0021 |
| 2004/0225425 A1* | 11/2004 | Kindo | G08G 1/0969 701/36 |
| 2005/0136857 A1 | 6/2005 | Yamamoto et al. | |
| 2006/0031015 A1* | 2/2006 | Paradie | G06K 9/00805 701/301 |
| 2007/0132577 A1* | 6/2007 | Kolavennu | G01S 5/021 340/539.13 |
| 2007/0216579 A1 | 9/2007 | Cheng et al. | |
| 2008/0002031 A1* | 1/2008 | Cana | G01S 5/0027 348/208.14 |
| 2008/0129825 A1* | 6/2008 | DeAngelis | A63B 24/0021 348/169 |
| 2008/0218414 A1 | 9/2008 | Hagerman et al. | |
| 2008/0231447 A1* | 9/2008 | Grossman | G01S 11/06 340/572.1 |
| 2009/0219393 A1* | 9/2009 | Vian | G07C 5/008 348/144 |
| 2009/0289850 A1 | 11/2009 | Liu | |
| 2010/0026578 A1 | 2/2010 | Furnanz et al. | |
| 2011/0025464 A1 | 2/2011 | Geng et al. | |
| 2013/0093615 A1* | 4/2013 | Jeon | G08B 13/19695 342/118 |
| 2013/0093896 A1* | 4/2013 | Jeon | G08B 13/19669 348/152 |
| 2013/0128054 A1 | 5/2013 | Densham et al. | |
| 2013/0162852 A1* | 6/2013 | Boyle | G06F 3/033 348/211.99 |
| 2013/0229528 A1 | 9/2013 | Taylor et al. | |
| 2013/0230293 A1 | 9/2013 | Boyle et al. | |
| 2013/0242105 A1 | 9/2013 | Boyle et al. | |
| 2013/0314268 A1* | 11/2013 | Fukuda | G01S 13/0209 342/21 |
| 2014/0009632 A1 | 1/2014 | Glover | |
| 2014/0132412 A1* | 5/2014 | Deco | H04W 4/029 340/539.13 |
| 2014/0192204 A1 | 7/2014 | Glazer | |
| 2014/0204230 A1 | 7/2014 | Boyle et al. | |
| 2014/0267744 A1 | 9/2014 | Taylor et al. | |
| 2014/0375455 A1 | 12/2014 | Taylor et al. | |
| 2015/0143443 A1 | 5/2015 | Boyle et al. | |
| 2015/0160328 A1* | 6/2015 | Peinhardt | G01S 5/0036 455/456.3 |
| 2015/0195451 A1 | 7/2015 | Glover | |
| 2015/0208023 A1 | 7/2015 | Boyle et al. | |
| 2015/0241546 A1 | 8/2015 | Boyle et al. | |
| 2015/0249778 A1 | 9/2015 | Taylor et al. | |
| 2015/0312354 A1 | 10/2015 | Boyle et al. | |
| 2016/0091349 A1 | 3/2016 | Tariolle et al. | |
| 2016/0133295 A1 | 5/2016 | Boyle et al. | |
| 2016/0377709 A1* | 12/2016 | Wang | G01S 11/08 342/454 |
| 2017/0134783 A1 | 5/2017 | Boyle et al. | |
| 2018/0205906 A1 | 7/2018 | Boyle et al. | |

OTHER PUBLICATIONS

Guevara et al., "Auto-localization algorithm for local positioning systems", Ad Hoc Networks, vol. 10, pp. 1090-1100, 2012.

* cited by examiner

APPARATUS AND METHOD FOR AUTOMATICALLY ORIENTING A CAMERA AT A TARGET

BACKGROUND

The problem of automatically orienting a camera at a target is well known and a number of solutions that, under specific conditions and with varying efficiency, may accomplish this task. Automatic recording of sporting and other activities has been accomplished when outdoors using systems that comprise GPS (global positioning system) antennas with good results. A product sold under the trademark SOLOSHOT®, designed, manufactured, and distributed by Soloshot, Inc., achieved considerable commercial success by providing instrumentation for automatic video recording that largely solved the problem of not having human camera operators available for filming amateur sportsmen and sportswomen for extended periods of time. Systems and instruments that rely on GPS signals are, however, subject to numerous limitations, the most important one being that GPS signals are not (or are not sufficiently) detectable indoors. None of the known indoor automatic camera orientation methods are sufficiently convenient and accurate for high quality video recording of, for example, sporting events, especially if they are operated by individuals rather than by the venue operators. It should be noted that here and elsewhere in this disclosure high quality video recording (HQVR) refers not to the quality of the camera, resolution, film or sensor, color filters, data compression methods and the like, but to the orienting of the camera in a way that the recording shows the intended subject at all times, the camera movements are smooth, and the focus and zoom of the camera are appropriate to show the subject.

Indoor automated video recording may be based on indoor or local positioning. Known indoor positioning systems include Wi-Fi based systems, grid layout systems, systems based on magnetic positioning, and systems based on dead reckoning. Such known indoor systems may use line of sight methods that are based on infrared or ultrasonic radiation emanating from a tag (sometimes called a beacon or remote unit) and detected by a controller system. (Note: some publications consider the tag to be "local" and the camera and associated hardware is denoted as "remote". This usage is not widely accepted. To avoid confusion such terminology will be avoided in this disclosure. In other words, the tag is considered remote and the camera (or pointer) and associated hardware are considered local.) Known positioning systems also use shape recognition, face recognition, and image recognition methods for indoor positioning; all such methods will be referred to in this disclosure as computer vision (CV). Each of the aforementioned methods have their advantages but also their weaknesses.

Wi-Fi based systems rely on measuring the signal strength received by multiple access points to determine the location of a target. Such methodology is highly inaccurate (on the order of two to four meters) and is easily disrupted by changes in the environment, such as, for example, shifted furniture. Wi-Fi based systems (as some others, like grid layout systems or traditional trilateration systems) require equipment to be set up and calibrated in known locations to accurately determine the location of the target being tracked.

Grid layout systems and systems using radio frequency identification (RFID) sensors require multiple sensors in known locations. These systems do not work well or at all outside of the designated area. If any sensors within a designated grid are moved, the readings are off. This is also a problem with trilateration systems. An example of such system is described by Tariolle et al. US Patent Application US 201610091349 (to be referred to as Tariolle). In paragraph [0008] Tariolle states "Studies have been made on auto-calibration of sensor nodes for 2D tracking, and mainly for indoors, due to applicative context and GPS availability. Trilaterations are the main tools for auto-calibration sometimes known as SLAT (Simultaneous Localization and Tracking), as explained in Jorge Guevara et al., "Auto-localization algorithm for local positioning systems", Ad Hoc Networks, Vol. 10, pp. 1090-1100, 2012." Tariolle further states in paragraph [0024]: "The object may be tracked using a strategy similar to that used by the auto-calibration described above to infer the anchor positions, such as the Kalman filter-based or extended Kalman filter-based strategy, and the Bayesian approaches, for example."

Others known positioning systems, such as magnetic positioning (that provide about one to two meters of accuracy), lack the accuracy to do what is necessary to orient a camera at a particular person for high quality video recording.

Other forms of indoor tracking that use dead reckoning are highly prone to drift and become much less accurate over time.

None of the known methods used for indoor positioning systems are accurate enough for high quality video recording while at the same time permitting filming at a variety of distances (not just at close range as in, for example, methods using infrared radiation). The known methods are also inconvenient, cumbersome, and require complicated and time consuming set-up and/or calibration prior to use.

Known GPS based cooperative tracking systems cannot operate indoors because the GPS signal detection is unreliable at best. Such systems also require calibration that takes about 15 minutes to complete and require users to learn a multi-step setup procedure. For many users, this appears too cumbersome and lengthy. Further, once such a system for automated recording is set up, the camera cannot be moved to another location without repeating the calibration.

A need exists for an automatic video recording system that provides a mobile camera that can be accurately aimed at a target (sometimes also called the object or the subject of the recording) without cumbersome equipment or lengthy system calibration procedures. Accurate aiming is a prerequisite to using high zoom when the target is not in close proximity to the recording apparatus. Further, to make such automatic video recording systems useful for virtually any user anywhere, both outdoors and indoors, one should avoid relying on preinstalled sensors, permanent fixtures at known locations, system calibration, and the like. The system should also remain operating when the recorded object or person is temporarily obscured, such as when the object or person is behind a structure, barrier, furniture, etc. (a problem when using known line of sight methods). Even further, tracking of the person or object should not be impeded by the recorded person's body movements that might interfere with the emitted infrared signal or even with image recognition.

One problem solved by the systems and methods of the present disclosure is how to have a camera track an object or person indoors or outdoors using a single fixture (i.e., camera plus positioning equipment) that is not at a permanent location, does not require calibration, that is not overly dependent on line of sight, and has a high degree of accuracy.

DETAILED DESCRIPTION

The systems and methods of the present disclosure described herein are based in part on the recognition that an automated video recording system does not have to determine absolute locations of the target being tracked and of the camera. It is sufficient to know the location of the target in relation to the camera to determine the direction in which the camera should point to record the target. Since the systems of the present disclosure do not keep track of the location of the camera and merely monitor the target's location, or the locations of multiple targets, in relation to the camera, the location of the camera is not constrained at the start of a recording session and may change during the recording. That is to say, the recording apparatus is mobile. Another aspect of the systems and methods of the present disclosure is that advanced automated editing methods may be employed to enhance the quality of the recorded videos.

One aspect of the inventive method involves using a ranging scheme. One such ranging scheme is described in DecaRanging (PC) User Guide, Version 2.5,© DecaWave 2014. Ranging here means determining a distance between a transmitter and a sensor. In the DecaRanging terminology, the remote transmitter is called a tag and the sensor at the measuring device is called an anchor. This terminology meshes well with the cooperative tracking terminology where a tag is a device carried by or associated with the object of the tracking and the base is the device tracking the tag. A DecaWave single ranging operation is initiated by the tag sending a poll message. When the anchor receives the poll it sends a response message. The tag then receives the response message and sends a final message with embedded transmit and receive timestamps for the poll, response and the final message itself. The anchor uses this information along with its own transmission and reception timestamps to calculate two round trip times which are used get the one-hop time-of-flight which equates to the distance when multiplied by the speed-of-light (i.e., the speed of the radio waves) in air. The anchor uses the response message to send a report of the previous calculated range back to the tag so both ends have a result and send a message to the base that is used for tracking. While we are describing here specific embodiments of the present disclosure that use a particular ranging device with a particular ranging methodology, this should not be construed as limiting the practice of the claimed invention to this device and methodology. In alternative embodiments, single path (tag to anchor) or multi-round (several back and forth signal exchanges) may be employed without departing from the invention hereof. Note that Tariolle uses the same DecaWave ranging hardware as the one described herein but employs trilateration for locating.

Figure 1:
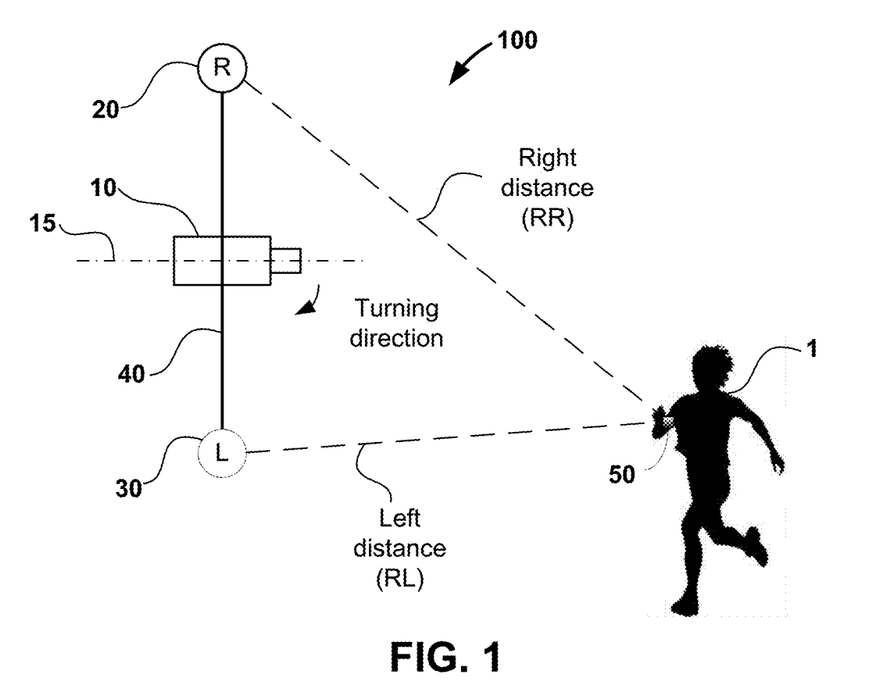
FIG. 1 is a schematic depiction of an implementation of an automatic video recording system of the present disclosure.

FIG. 1 is a schematic depiction of an automatic video recording system of the present disclosure. The automatic video recording system is used to carry out a method of automatically tracking an object by a camera (or pointer). Automatic video recording system 100 comprises sensors (sensor 20 and sensor 30) mounted on a rigid structure 40 that moves with camera 10 if camera 10 is turned or is otherwise moved. The sensors are spatially separated, as shown. As a practical matter, system 100 also includes a controller for processing the information regarding the turning direction and a positioner to make the system turn but these elements are not shown in FIG. 1. Sensors (20, 30) may also be referred to as anchors. Tag 50 is associated with the object being recorded. Tag 50 is configured to periodically emit and receive radio signals used for pairing it with the camera, for ranging, and possibly for a variety of control functions. In FIG. 1, subject 1 of the recording wears tag 50 (which may also be called a beacon or remote unit), and radio transmissions originating from tag 50 are sensed or detected by right sensor 20 (denoted R) and left sensor 30 (denoted L). The radio transmissions from tag 50 comprise timing information usable to compute a tag-to-sensor range. Using ranging technology, the right distance and left distance are determined and tag-to-sensor differences are calculated so the camera is turned to the direction of the shorter distance (in the example of FIG. 1 the shorter distance is the left distance) to point the camera at tag 50 and, by implication, at subject 1. In the implementation of FIG. 1 there is only one turning axis; this axis is perpendicular to the plane of the drawing and is located at the intersection of camera axis 15 and the line connecting the two sensors. In FIG. 1, sensors 20 and 30 are equidistant from camera 10. However, it is not necessary to construct the system with similar geometry; those skilled in the art will recognize that there is wide latitude in placement of the array of sensors if their position relative to the pointer is fixed (in FIG. 1, the pointer is camera 10). In the implementation of FIG. 1, the two sensors are paired with tag 50. There could be multiple tags in the same vicinity and pairing ensures that only signals coming from the paired tag are detected by the sensors. The system can be mounted on a vehicle, such as a car, a boat, etc. The system may be implemented on or as a flying drone, where the fixed sensors may be placed at the ends of, for example, a quadcopter's arms and the turning mechanism comprises the propellers of the drone (see FIG. 9). Using tripod 80 (see FIG. 2) is optional.

The pointer or camera is oriented such that either the differences between the distances determined by each sensor are minimized or kept at an appropriate amount for proper orienting. The difference between the distances determined by different sensors depends in part on where the sensors are located with respect to the camera. For example, if two sensors are both on the same side of the camera in a straight line and the camera or pointer points perpendicularly to that straight line, the difference between the tag-to-sensor distances will not be minimum when the camera points at the tag.

Figure 2:
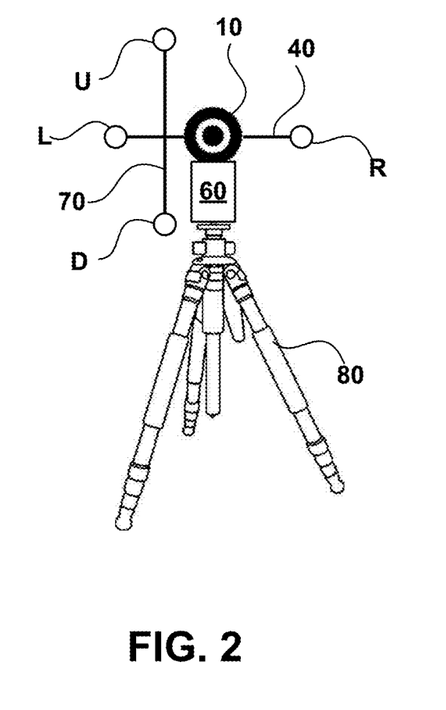
FIG. 2 is a schematic depiction of a second implementation of an automatic video recording system of the present disclosure.

Using two sensors permits one to build a pointing system with one turning axis, for example, a panning device. For a device that can both pan and tilt (i.e., a device that can orient a pointer in any direction), at least three sensors are required. A minimum of three sensors not mounted on the same straight line, in other words not all mounted collinearly, is mathematically sufficient to carry out such pan and tilt tracking. However, the system may be improved by using more than the minimum number of sensors for each degree of freedom. The sensors may be arranged in a triangular arrangement such as a perfect triangle with the pointer (camera) at the center of the triangle. A triangular arrangement is shown in FIG. 2 where sensors R, U, and D form a perfect triangle. (Sensor L does not play a role in such a triangular arrangement, and if the triangular arrangement discussed here is used, sensor L is omitted). The arrangement is turned such that the three sensors are equidistant from the tag. Another approach may be using trigonometric relations to find the angle offset from where the camera is pointing versus where it should be pointing based on the relative location of the tag and adjusting the camera by that angle.

Having a four sensor array provides useful redundancy for the system and may provide additional benefit such as providing a larger area to mount cameras, lights, directional antennas or other pointing devices without collision or obstruction. Four sensors may be used to provide symmetry in a system architecture having a Cartesian (orthogonal) arrangement of driving motors. In one implementation of the present disclosure shown in FIG. 2 there are four sensors (R, L, U and D), making a four-sensor array, rigidly attached to camera 10 by frame 70. Camera 10 is oriented by positioner 60 capable of both panning (moving left or right around a vertical axis) and tilting (moving up and down around a horizontal axis). Positioner 60 is mounted on tripod 80 in the implementation of FIG. 2, but those skilled in the art will recognize that any platform could be used in lieu of a tripod and that such platform could even be implemented as a vehicle that moves around during filming (such as a drone). Rigid frame 70 is structurally connected to camera 10. In the implementation of FIG. 2, frame 70 holds four spatially separated sensors; all sensors are rigidly attached or structurally connected to the frame. The system of FIG. 2 also comprises an intelligent control device preferably integrated with positioner 60 (although, in various implementations, the control device could be separate and may only communicate with the rest of the system wirelessly). The control device receives the information for ranging computations, carries out such computations, and provides turning commands to positioner 60. To complement tracking based on ranging, the control device may also run algorithms that control the angular velocity of turning, may provide zooming and focusing information directly to camera 10, may receive footage from camera 10, and may run computer vision (image recognition) routines (see U.S. Pat. No. 8,749,634 and U.S. patent application Ser. No. 13/801,336, by Boyle et al. filed Mar. 12, 2013, titled "SYSTEM AND METHOD FOR VIDEO RECORDING AND WEBCASTING SPORTING EVENTS", and U.S. patent application Ser. No. 14/630,524 by Boyle et al. filed Feb. 24, 2015, titled "COOPERATIVE AUTOMATIC TRACKING", all of which are incorporated herein by this reference). The control device may also respond to user commands. Such commands may range from simple on/off commands to more complex commands, including, for example, commands related to choosing the tag to follow when the system comprises multiple tags. Broadly speaking, the control device is the brain of the system but may take inputs from users that cause adjustment in decision making.

In FIG. 2, the four sensors are paired with a single transmitter tag (not shown) attached to the target being tracked (also not shown; however, schematically the picture is similar to that shown in FIG. 1 except for the number of sensors). The distances between the tag and each of the four sensors are periodically determined. The sensor array is mounted such that the sensors always move with the camera and the camera and the sensor array always point in the same direction. The sensors are implemented as directional patch antennas that are mounted coplanar with the plane of the array. The patch antennas have a front side and a back side; the front side normal is the pointing direction of a patch antenna. The pointing direction of the sensor array is the direction of the normal of the plane in which the sensors are located. In other words, the direction of the sensor array is the same as the direction of the sensors. This type of mounting is not an absolute requirement. For example, a sensor may be mounted outside of the plane of the other sensors because of space constraints. The mounting difference can be accounted for in evaluating the distance differences by adding or subtracting a constant value from the measured distance for the out-of-plane sensor. Other mounting designs may also be used but one must account for distance and/or direction differences.

Figure 11:
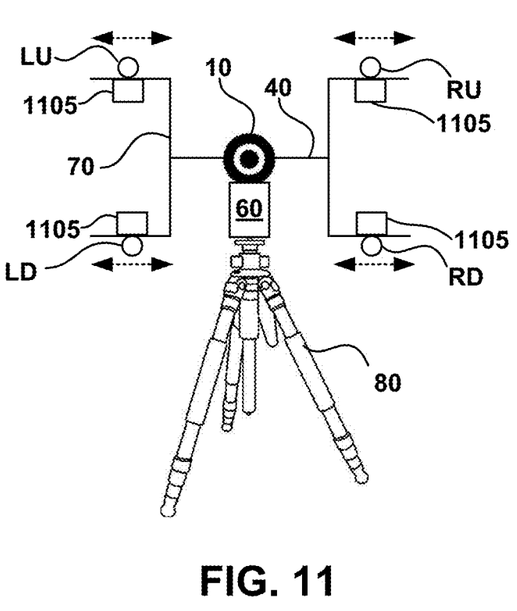
FIG. 11 is a schematic diagram of an implementation of a base of an automatic video recording system of the present disclosure.

It is not necessary that the camera and the sensor array point in the same direction; however, this is the simplest way to practice the invention. Even maintaining a constant angle between the pointing directions of the camera and the sensor array is not required. Again, however, maintaining such a constant angle is the simplest way to practice the invention. It is sufficient to know the instantaneous angle between the pointing directions of the pointer and that of the sensor array. Further, mounting of the sensors on a rigid frame is not required as long as the instantaneous location of each sensor is known within a coordinate system, and the instantaneous pointing angle of the pointer is known within the same coordinate system. In such a system, commands for a positioner designed to turn the pointer may be computed. However, such arrangements complicate the computational task of determining orientation commands for the motors that orient the pointer. The arrangements of the pointer (camera) and sensors described in more detail with reference to the figures in this disclosure are just some of the possible implementations. For example, one may design an apparatus wherein sensors may be moved farther from each other when higher precision of the tracking is required and closer for more coarse tracking. In some embodiments switching between coarse and precision tracking may be manual, in others this function could be triggered automatically depending on tag movement characteristics, tracking distance, or other criteria related to the content of the recording. FIG. 11 is a schematic diagram of an implementation of a base of an automatic video recording system of the present disclosure. FIG. 11 shows that the sensor distance may be changed. Driving motors 1105 are operably connected to sensors (LU, RU, LD, RD) to change the distances of the sensors. After reading this specification, those with skill in the art will understand that other arrangements and implementations may suffice that will fall within and constitute practice of the claimed invention.

For turning, the ranges between the tag and each of the sensors on the base are calculated and then the differences between those ranges are used to point the camera at the target. Different ways of aiming the camera at the tag may be employed. For example, if the sensors are mounted in a symmetrical array around the camera, then the sensor array and the camera may be turned until all of the sensors are equidistant to the tag.

In the implementation of FIG. 2, the distance difference between the tag and sensors L and R may be used to control the pan motor such that it turns to the direction of the shorter distance, while the distance difference between the tag and sensors U and D may be used to control the tilt motor in a similar fashion. Clearly, both motors will stop when the mentioned distance differences become too small to matter. A deadband (an angular limit) may be defined by the manufacturer or by the user to restrict camera movements to those exceeding a minimum angle. Such a deadband may eliminate jittery camera movements that could arise from insignificant changes in the distance differences detected.

Figure 3:
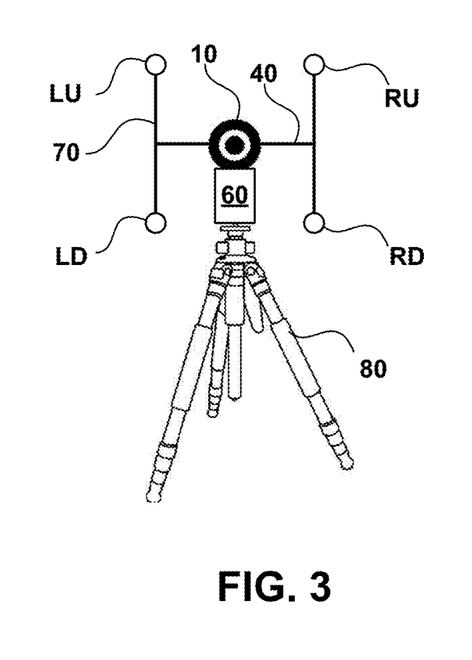
FIG. 3 is a schematic depiction of a third implementation of an automatic video recording system of the present disclosure.
Figure 4:
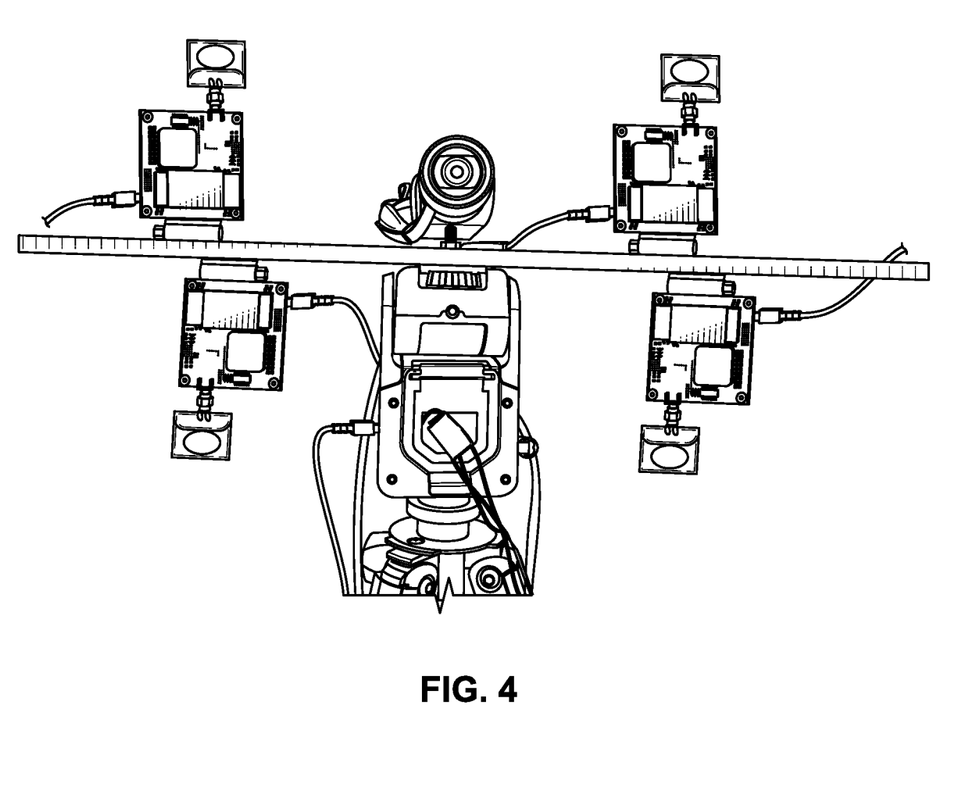
FIG. 4 is a photograph showing an experimental setup of an automatic video recording system of the present disclosure.

FIG. 3 shows an example of an implementation of the present disclosure where the sensor array is in a quadrangular arrangement around the pointer (camera). The part numbers used in FIG. 3 that are the same as those in FIG. 2 depict similar components. Use of the arrangement of sensors shown in FIG. 3 permits measuring and evaluating distance differences between different pairs of sensors. For example, one may determine the differences of tag to sensor distances for sensors LU and RU and similarly for sensors LD and RD then average the results. The averages are used to determine the panning direction. Likewise, differences between tag to sensor distances for sensor pair LU and LD may be averaged with those for pair RU and RD to determine tilt turning direction. Clearly, one could employ additional sensors and compute averages from more information; however, increasing the number of sensors will eventually become prohibitively expensive and accuracy only improves with the square root of sensor number. FIG. 4 is a photograph showing an experimental setup of an automatic video recording system of the present disclosure. The photograph of FIG. 4 shows a pre-prototype build of an automatic video recording system. The device of FIG. 4 provided, according to experimental studies, an accuracy of about 10 centimeters under realistic circumstances. The method relies on accurate time measurements. Thus, the system is prone only to one form of drift, namely, clock drift, which is much easier to reconcile than other forms of drift. The orienting systems of the present disclosure may also move (or be moved) while tracking the object. The systems of the present disclosure do not rely on any radiation sources placed in fixed locations around the area where the filming is completed and the camera can be moved freely without affecting the quality of the tracking. In the arrangement shown in FIG. 4, the sensors are separated from one another by about one foot. The separation distance determines how well the system tracks in view of distance measurement uncertainty. Compared to using trigonometric relations to calculate turning angles, it is very advantageous to use the rule of turning to the direction of the sensor that detected the shorter distance to the tag. This method relies in part on symmetrical mounting of the sensors around the pointer (camera). If the sensors are closer together, the system is more responsive (due to reduced inertia), but slightly more affected by errors in range calculations (which are originally time measurement errors), while when they are further apart the response time is slightly slower but it is less affected by small errors in range calculations. There is no specific distance that is required, but a minimum separation of at least 10-20 centimeters is preferable, considering the currently available ranging hardware, to avoid major fluctuations from error. If the sensors would be separated by only two centimeters, the largest difference that could be detected between the tag-to-sensor distances would be two centimeters. The separation distance of the sensors limits the acceptable error in ranging. Assume, for example, that the tag is directly to the right of the camera. If the right sensor has an error of +4 centimeters and the left one is perfectly accurate, the system will have an error of 180 degrees and perceive that the tag is exactly to the left of the camera instead of being on the right and swing the wrong way when turned. The farther the sensors are apart will result in a smaller error angle caused by the same four centimeter error in ranging.

Figure 10:
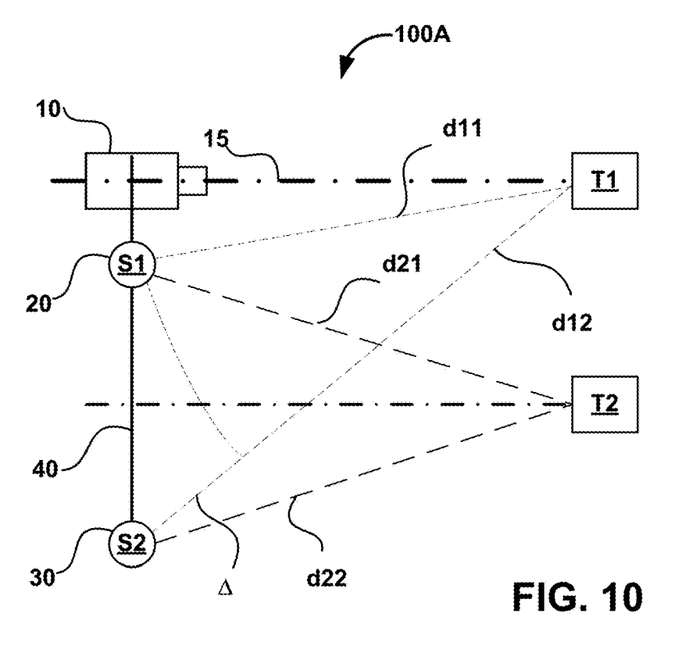
FIG. 10 is a schematic diagram of the tag-to sensor distances when the sensor arrangement is asymmetric.

The fact that the apparatus and method of the present disclosure are practical is surprising and unexpected because it is assumed by most persons familiar with ranging technologies that the positioning error of this arrangement is too large. For example, if one considers the standard ranging error to be ±10 centimeters, one expects that the error for the difference between the right sensor and left sensor when they are equidistant from the tag might be as large as 20 centimeters, which would be unacceptable. However, this common assumption in the art is not what we experience in practice. We experience an error for the difference between the tag-to-sensor distances as low as 1 or 2 centimeters in most cases. One of the advantages of the symmetrical arrangement of sensors around the camera is that the orienting task is reduced to that of a null detector and thus much of the noise of the distance measurement data is filtered out. The same principle may be used for asymmetric sensor arrangements but the compared distance data have to be appropriately biased. Consider FIG. 10, in which camera 10 points directly at tag T1 but tag T2 is equidistant from sensors S1 and S2 (d21=d22), so the minimum difference between the tag-to-sensor distances is at the location where tag T2 is. In contrast, there is a non-zero difference between d12 and d11. This can be taken into consideration by adjusting all ranging differences by a constant $\Delta = d21 - d11$.

Figure 5:
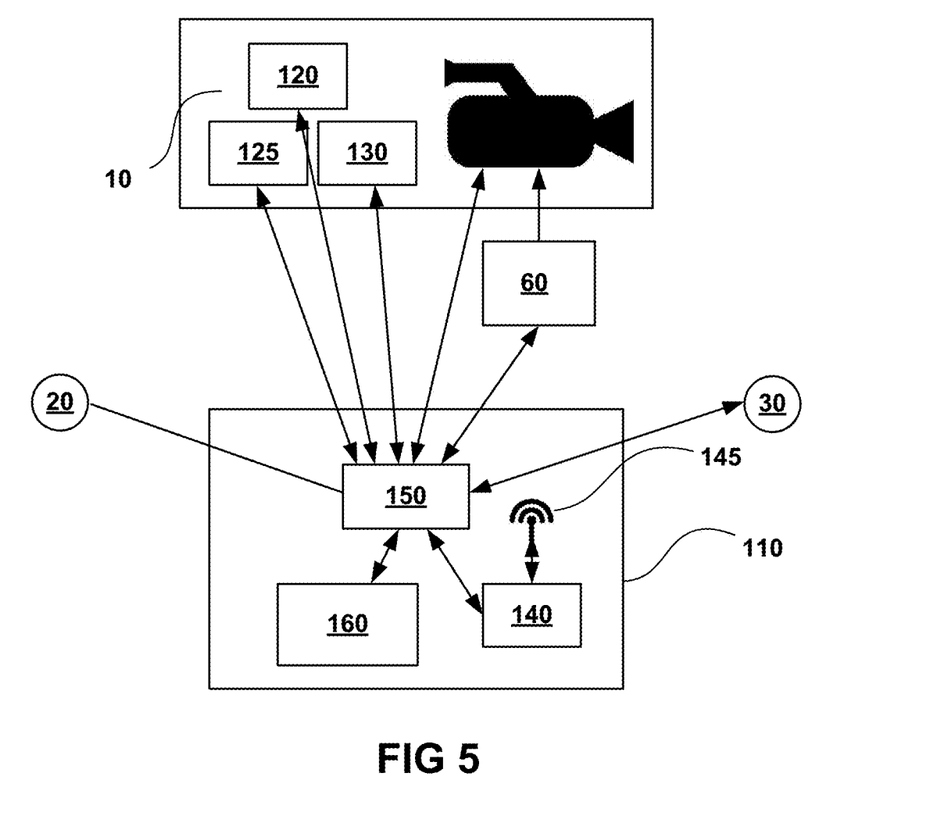
FIG. 5 is a schematic diagram of an implementation of a base of an automatic video recording system of the present disclosure.

FIG. 5 is a schematic diagram of a base of the system according to an implementation of the present disclosure. Control device 110 comprises microprocessor 150, transceiver 140 with antenna 145, and interactive display 160. Microprocessor 150 receives input from GPS antenna 120, pressure sensor 125 and from inertial measurement unit (IMU) unit 130. GPS antenna 120, pressure sensor 125, and IMU unit 130 are associated directly with camera 10 because their purpose is to determine the location and orientation of the camera 10. IMU unit 130 may comprise accelerometer and compass. In some implementations, pressure sensor 125 may not be included and tilting of the camera may be based on GPS data when ranging is not used.

Microprocessor 150 also receives input from sensors 20 and 30 and uses the received information for commanding positioner 60 to pan camera 10. In other implementations, like those depicted in FIGS. 2 and 3, there may be additional sensors communicating with microprocessor 150; these communications may be used for generating commands for tilting camera 10.

Microprocessor 150 also receives input from transceiver 140 and from interactive display 160. These inputs may comprise user settings and commands, and location communication from tag 50 (FIG. 1) if the tag comprises a GPS unit. Communication from tag 50 may be by radio and is received using antenna 45.

FIG. 5 shows two-way communication with every unit connected with microprocessor 150. In the case of sensors 20, 30, 120, 125, and 130, these communications to the sensors may be polling messages, for example. Communication with camera 10 comprises control commands for adjusting zoom and focus on the one hand and camera 10 may send footage and metadata to microprocessor 150. Footage may be stored in a memory device (not shown) within control device 110. Footage and metadata may be employed by microprocessor 150 for generating orienting commands for camera 10 using computer vision (CV) software. Computer vision may be augmented by machine learning to provide orientation commands that are even more responsive and accurate than those generated by the system at the start of an automatic filming session.

Communication with transceiver 140 may be employed for receiving information from tag 50 as described above; these communications may also include remote control commands. Further, control device 110 may send communications, such as system status updates, to tag 50, and it may also transmit filming footage and metadata to a remote computer or computers (including the Internet or the cloud).

Positioner 60 receives camera orientation commands from microprocessor 150. These commands are not necessarily limited to designating turning angles; they may include commands that translate into angular velocity, for example. Such commands are computed using an algorithm designed to optimize the tracking performance of the system. In turn, positioner 60 reports actual turning angles to microprocessor 150; this information is used in the algorithm designed to optimize the tracking performance of the system. Positioner 60 comprises one or more motors that turn camera 10 toward the subject of the recording.

Those skilled in the art of electronics will realize that various parts of the tracking camera system described with the aid of FIG. 5 require power sources, switches, and possibly other electronic parts for proper operation, even though such parts are not shown or described herein. Also, multiple microprocessors could be employed in control device 110 instead of the single microprocessor 150 described herein to optimize the functioning of the tracking camera system. Incorporating such parts or elements and the connections that come with such incorporations does not constitute a departure from the claimed invention.

Figure 6:
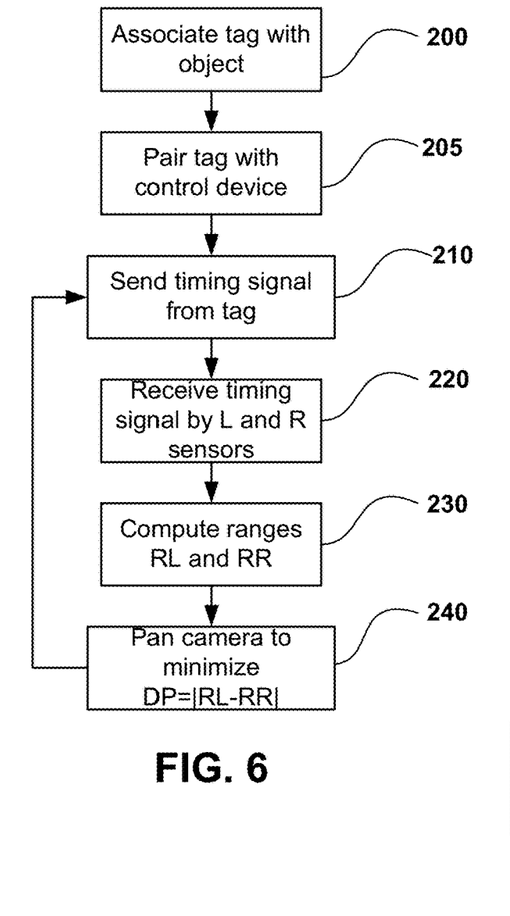
FIG. 6 is a flowchart of an automatic video recording method of the present disclosure.

FIG. 6 is a flowchart of an automatic video recording method of the present disclosure. In step 200, a tag (item 50, FIG. 1) is associated with an object to be filmed (item 1, FIG. 1). The object may be a person, a vehicle, an animal, etc. Association means that a physical connection is made between the tag and the object such that for the duration of the filming, and for the purpose of orienting the camera at the object, it is sufficient to orient the camera at the tag. This may be accomplished in many ways. For example, the tag may be attached to an armband (as a wristwatch to a band) and the armband attached to the arm of the person to be filmed. In step 205, the tag is paired with the control device (item 110, FIG. 5) of the automated filming apparatus. Steps 210, 220, and 230 may be referred to, in combination, as ranging sensors R and L (items 20 and 30, respectively, FIG. 1) with respect to the tag. In step 210, a timing radio signal is emitted by the tag. In step 220, the signal is received by the sensors. In step 230, the RL and RR distances (FIG. 1) are computed. (In some ranging implementations the sensor returns a signal to the tag and the tag sends one more signal to the sensor; thus three passes are used to get the range. All these are sub-steps that are implied in steps 220 and 230 in such implementations.) In step 240, the camera (camera 10, FIG. 1) is panned such that the absolute value of the difference between the RL and RR distances, $\Delta P=|RL-RR|$ is minimized (P is used here to indicate panning). In other words, the camera is turned toward the sensor that is closer to the tag. This process is repeated with the frequency of the tag emitting timing signal. Step 240 may be modified not to turn the camera if $\Delta P$ is smaller than a predetermined value. This value may depend on the accuracy of the ranging and on the physical parameters of the tracking camera, including the separation distance between the L and R sensors.

Those trained in the art of tracking objects with cameras will realize that, in principle, three sensors may provide sufficient information to accomplish tracking by both panning and tilting the camera by modifying the tracking method of FIG. 6. While it is not shown as a separate step in FIG. 6, it is implied that the camera normally would be used to record the object that is tracked and that in that process the camera would be controlled to have the appropriate zoom and focus.

The method of automatically tracking an object by a camera of FIG. 6 may be modified by employing an array of four sensors spatially separated from each other. As described in conjunction with FIG. 2 above, it is useful to situate two sensors such that panning could be accomplished according to the method of FIG. 6, while two more sensors may be situated such that tilting may be accomplished. To do this, one replaces step 220 with receiving timing signal by sensors U and D (as shown in FIG. 2). Step 230 is then replaced by a step in which one computes ranges RU and RD, i.e., the distances between the tag and sensor U and sensor D, respectively. Finally, step 240 is replaced by a step in which camera 10 is tilted to minimize the difference between the RU and RD distances. This difference that relates to tilting may be expressed as $\Delta T=|RU-RD|$. As in the case of panning, this last step may be modified to not tilt the camera when $\Delta T$ is smaller than a predetermined threshold value.

Figure 7:
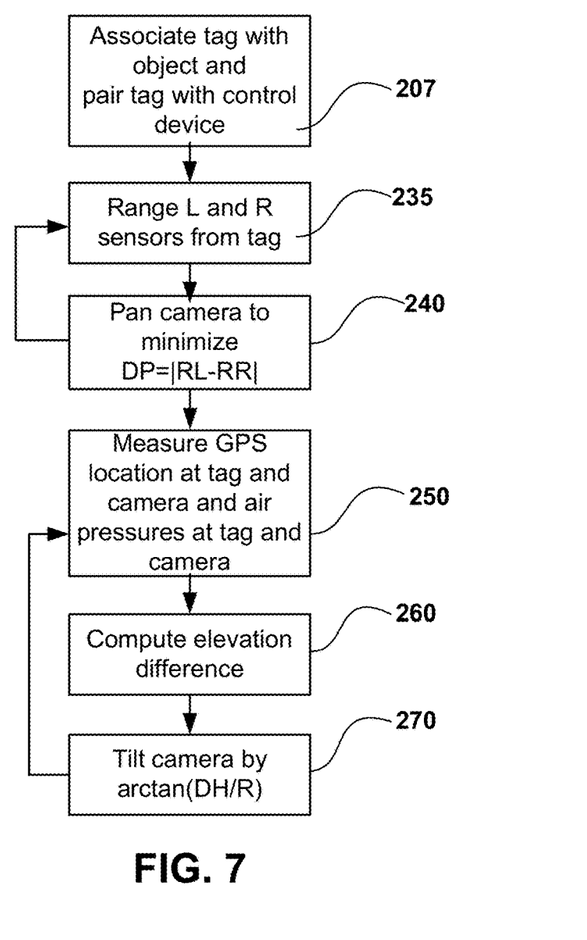
FIG. 7 is a flowchart of another automatic video recording method of the present disclosure.

FIG. 7 shows how the method for automatically tracking an object of FIG. 6 may be combined with employing pressure sensors configured to detect air pressure as part of the tag and camera. Step 207 is a combination of steps 200 and 205 of FIG. 6 and provides for associating a tag with an object and pairing it with the control device. Step 235 is a combination of steps 210, 220, and 230 of FIG. 6 and accounts for ranging sensors L and R from the tag, i.e., determining distances RL and RR. It is not indicated as a separate step but the tag-to-camera distance, R, is computed as the arithmetic mean of RL and RR. Step 240 is the same as in FIG. 6. In step 250, the GPS location of the tag and camera are determined and the air pressure measuring devices associated with the tag and with the camera (the latter is shown in FIG. 5) are employed. The air pressure data are converted into elevation values in step 260. Note that even though the absolute values of elevations determined from air pressure are subject to significant error due to atmospheric conditions, the difference of air pressures and consequently the difference between elevations may be far less sensitive to those conditions. We denote the elevation difference here as $\Delta H$; this value is positive if the tag is at a higher elevation than the control device. In step 270 the angular difference between the horizontal direction and the direction of the camera pointing at the tag is calculated as arctan(ΔH/R); this angle is positive (the camera points up) if the tag is at a higher elevation (lower air pressure) than the control device.

While it is not shown as a separate step in FIG. 7, it is implied that the camera normally would be used to record the object that is tracked and that in that process the camera would be controlled to have the appropriate zoom and focus.

One of the advantages of the range based cooperative tracking methods described herein is that they are not affected by presence of obstacles (e.g., furniture) or other environmental issues. Since all sensors are roughly at the same location, if the tag goes behind an object, the sensors will still pick up the radio signals from the tag and the arrival time differences will not be significantly affected in most cases. Since the obstacle attenuates all the signals by about the same amount, the relative offset (the distance difference detected by the sensors) will still be qualitatively the same, allowing for continuous tracking of the tag. As both signals are passing through the same medium, the attenuation doesn't matter for tracking, but it may slightly lessen the working range (the maximum distance from where the radio signals emitted by the tag are safely detected by the sensors). The detected range and the working range may be slightly reduced, but not enough to cause problems in the tracking system of the present disclosure. The reduction of the detected range by attenuation may affect the zoom, which is based on the detected range, but if the target is hidden, zooming is not a concern.

The tracking systems of the present disclosure are mobile, do not require permanent fixtures, does not have its signal blocked easily (and when signal is blocked it does not have a significant negative impact on system performance), and is not subject to the same forms of drift as dead reckoning systems, yet it is still highly accurate. The tracking systems of the present disclosure are also capable of continuing to track while actively being moved. One likely application of the tracking systems is one in which the camera and the sensors are mounted on an automatic flying machine or drone. The tradeoff is that it is only capable of relative tracking and cannot provide absolute locations without additional input. The system is, however, capable of creating a map of the filming location over time. These features are important for certain webcasting and editing functions.

The tracking systems of the present disclosure may also be employed in producing feature film footage. The base, orienting device, and camera may be mounted on a cart that moves along a rail system according to a program.

The tracking systems of the present disclosure may work with a multiplicity of tags. The tags may all be paired to a control device and the control device may be programmed to track certain tags according to a schedule or according to criteria, such as proximity, velocity, or VIP status. These possibilities, combined with the mobility, may make tracking systems of the present disclosure very useful, for example, in filming stunts.

Figure 8:
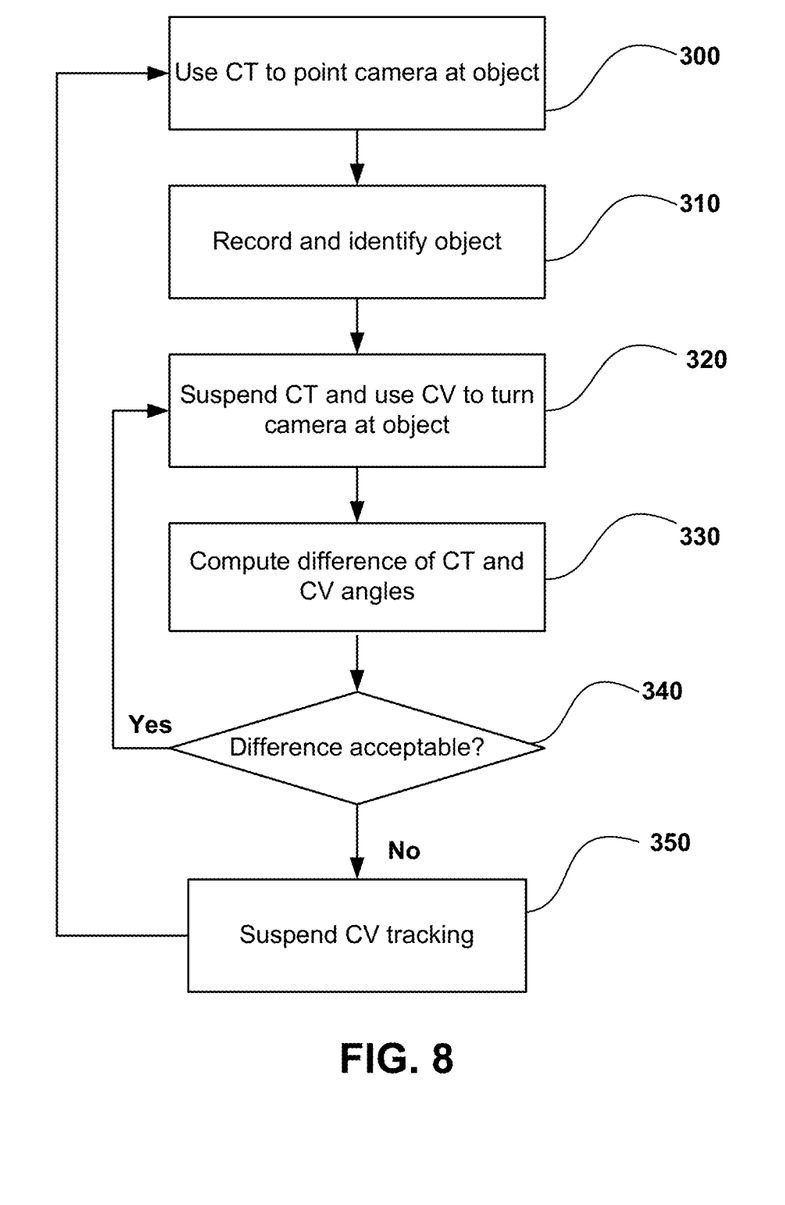
FIG. 8 is a flowchart of yet another automatic video recording method of the present disclosure.

The methods described with the aid of FIGS. 6 and 7 may be considered methods of cooperative tracking (CT). Other methods of cooperative tracking include, for example, tracking using GPS devices. Using instantaneous GPS coordinates of a camera and a tag, a pointing vector between the camera and a tag is determined. The pointing vector is periodically updated as the object associated with the tag moves and the camera is oriented along the pointing vector. FIG. 8 shows a flow chart of a tracking method according to an implementation of the present disclosure in which CT and computer vision (CV) based methods are combined. In step 300, CT is used to point a camera at an object. As in the methods of FIGS. 6 and 7, the object has to be associated with a tag and the tag must be paired with the control device that controls the orienting of the camera; all this is implied in step 300. In step 310 the object is recorded and computer vision is used to identify the object of tracking. In step 320 cooperative tracking is suspended and a CV algorithm is employed to keep the camera pointing at the moving object. (The camera itself may also be moving although this may complicate the CV tracking.) Thus, in step 320 CV is used to keep the object in the frame of the camera while also suspending the step of turning the camera in a direction that reduces the difference between the tag-to-sensor distances, according to the specific CT methods described with the help of FIGS. 6 and 7. However, suspending cooperative tracking does not mean suspending all the steps of FIGS. 6 and 7, only steps 240 and 270, i.e., only the steps where the camera is actually turned are suspended. The microprocessor of the control device keeps determining turning directions based on steps leading up to the suspended steps. The actual camera direction that is at this point determined by CV tracking is continually checked against the direction of the camera that would be the direction if CT was in effect (step 330). A decision is then made in step 340: if the difference between the two angles is acceptable then the process returns to step 320 and CV tracking continues. The threshold for what is not an acceptable difference between the CT and CV tracking angle is a matter of manufacturer or user discretion. For example, it may be set as one half of the angle of the field of view angle of the camera. If, however, the difference is too large, CV tracking is suspended (step 350) and CT tracking is resumed (step 300).

Figure 9:
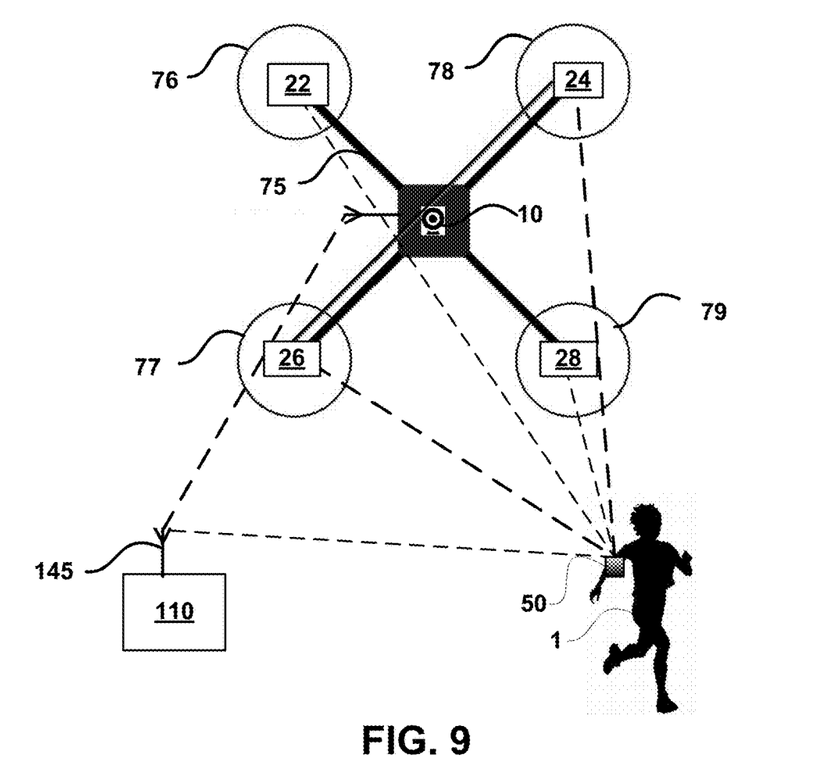
FIG. 9 is a schematic diagram of an implementation of the automatic video recording method as a drone of the present disclosure.

As explained above, the described cooperative tracking method based on using ranging and turning the camera to minimize the difference between ranges from the tag to the anchors mounted on a rigid frame that also supports the camera may be used when the frame itself is moving. A particular example of such a system is shown in FIG. 9 where the frame is part of or mounted on a drone. A drone is a small unmanned aircraft that is controlled from afar (e.g., the ground) and may also be programmed to fly along a preselected trajectory. A specific example of a drone is quadcopter 75 in FIG. 9. The quadcopter shown in FIG. 9 is schematically shown as it would be seen when viewed from below (from the ground) with camera 10 attached and pointing downward. Propellers 76, 77, 78, and 79 are powered by dedicated motors (not shown). Subject 1 of the filming wears tag 50 that communicates with control device 110 and sends/receives ranging signals to/from anchors 22, 24, 26, and 28. All communication connections are shown in FIG. 9 using broken lines. Control device 110 communicates with drone 75 and tag 50 by radio using antenna 145. Control device 110 sends control signals that orient quadcopter 75 (and camera 10 with it) such that all four anchors are equidistant from tag 50. In some implementations, control device 110 may be built as part of tag 50 or as part of quadcopter 75. In FIG. 9, anchors are shown as positioned essentially together with the motors (not shown) that power the propellers of the quadcopter. This simple design may be modified and the anchors may be positioned differently as long as they are attached to a rigid structure that also supports the camera. The drone may be programmed to hover at essentially the same location during filming or it may fly according to user instruction. Alternatively, the drone may be programmed to move depending on the circumstances; for example, it may follow the subject such that the distance between the subject and the drone does not exceed a preset value. The drone may also be programmed to sense and avoid obstacles, such as power lines and the like.

Like GPS-based cooperative tracking (GCT), the tracking method based on range determination (i.e., range-based cooperative tracking or RCT) is an open loop control of the pointer with respect to video (this also may be described as blind tracking). If the pointer is a camera, the control can be made into closed loop by applying computer vision (CV) to the captured video stream. The importance of CV is, in part, that it reduces the accuracy requirements of RCT; this is very important for keeping the apparatus compact. In one implementation of the present disclosure, first RCT roughly orients the camera at the subject (coarse tracking), then CV may recognize the subject based on its movements within the frame or from prior memory and improve the quality of tracking (fine tracking), keeping the subject in center and making tighter shots possible. When CV is used for tracking, RCT continues to operate in the background but does not generate orienting commands for the positioner. If the CV tracking appears to be off (the subject is not identified with high confidence either based on CV data evaluation within the CV software or based on expected movement of the subject within the frame as predicted by RCT), then RCT is turned on and reorients the camera. During CV control the system may keep track of the difference between the orientation direction and the direction computed based on RCT. If the difference exceeds a threshold value for a time that is longer than a set limit, the system could return to RCT control, perform identification of the subject and continue the process. Note that when using stationary cameras, in many CV routines the background is identified as an unmoving features (for example, edges) in the picture while the moving subject is composed of features (pixels or groups of pixels) that move together. When using CV for tracking as here, roles may be reversed; not moving or slowly moving features are the foreground (the subject of the recording) and features that move generally with the same velocity in a direction opposite to the camera movement are identified as the background. However, when there are multiple pixel groups that move only slowly in the frame there may be some difficulty in distinguishing between these. For example, if the system tracks biker A in a race and biker A is passed by biker B, CV may confuse biker B with biker A and start tracking biker B if their motion within the frame are sufficiently the same. The availability of RCT or GPS based cooperative tracking (if outdoors) may be of great significance in this case. After a few seconds the problem of tracking the wrong object becomes obvious and may be corrected automatically.

A problem with RCT, similar to GCT, is that there is a lag time or latency causing the tracking to lag behind the subject's movements. Note that while using current technology the refreshing rate of most GPS type systems is still 5 Hz, the refreshing rate of ranging may be 10 Hz, thus providing an immediate advantage for ranging compared to GPS. CV may reduce the lag time issue as well once the system has used RCT or GCT to determine the subject in the frame; according to a paper published by ACM in 2012 (K. Pulli et al.: "Real time Computer Vision with Open CV" 2012 ACM 1542-7730/12) a frame may be analyzed within 30-40 milliseconds, although the authors called this challenging especially for mobile devices. As computing technology improves, CV will likely become even faster.

If tracking is outdoors, GCT works well but CV is still beneficial such as to eliminate the need for system calibration or to reduce system latency. One may use all three tracking methods (GCT, RCT and CV) in conjunction. One instance when this may prove very useful is when the activity is partly indoors and partly outdoors.

In addition to GCT, one may use also altimeters that use air pressure measurement data to determine altitude associated with a tag and with the pointer to determine altitude differences between them as the tag moves or both the tag and the pointer move. The tilt movement of the pointer in the pointing process may be determined using such altitude differences.

Footage obtained using automated camera systems may contain that of no important action, such as, for example, a surfer paddling out or waiting for a wave. Automated camera systems may benefit from programming that makes use of such periods of "no action" to create B roll footage automatically during the automatic filming session. That is, the system may be configured to create robotic automated B roll (including focus rack and zoom rack) footage.

B roll footage is created when the system detects "no action" based on the subject's movements, speed, acceleration, etc. Examples of B roll footage that may be created automatically include: slow pan around the subject; zooming out or zoom rack turn the camera at noted interesting landmarks based on map information; turn the camera at the sun briefly to create flare effect; turn the camera at noise sources (like clapping); focus rack; and many others.

B roll footage is created when "no action" is detected. All such footage is marked with time stamp and is identified for the user on a digital map or similar layout view by dots of different colors or signs at the location where the subject was at the time. Using a pointing technique identifies the type of B roll. The user or the system may use the B roll footage and insert such footage between highlights (actions) as the machine or user sees fit.

An automated editing program may insert B roll footage automatically according to certain user preferences or based on learned preferences from the user or all users. Both the process of automatically creating and automatically inserting B roll footage in the edited footage may be subject to machine learning. User feedback helps to improve the recording and editing process in two ways: personal preferences may be updated as the program notes that the actual preferences of a user are different from the originally input or learned preferences of a user. General user feedback by user action of selecting B rolls and by using B rolls at particular points in the edited video are noted, statistics built, and algorithms are modified consequently.

In an alternative embodiment, the automatic video recording system may create B roll footage at random time points or based on other data input than that pointing to "no action". For example, racking focus and zoom may be done randomly or at times when the image being captured indicates presence of a more remote background with the close-by subject.

In the case of GCT subject locations are known and placing the subject on a map service (such as Google maps) is not a problem. In the case of RCT this may be a more difficult problem. A possible solution is to generate a map of the area using computer vision. This can be done with a stereoscopic camera accessory and the technology for this is already mature. A map created this way may be compared with a known map of the venue and thus actual locations may be generated.

Different embodiments, features and methods of the invention are described with the aid of the figures, however the described implementations, embodiments, features and methods should not be construed as being the only ones that constitute the practice of the invention and the described embodiments, features and methods are in no way substitutes for the broadest interpretation of the invention as claimed.

What is claimed:

1. A method of automatically tracking an object by a pointer, said method comprising the steps of
associating a tag with the object and using said tag to periodically emit and to receive radio signals;
providing a positioner configured to turn the pointer and configured to have two turning axes that are perpendicular to each other and to the pointing direction of the pointer;
providing an array of sensors structurally connected to the pointer and the array of sensors comprising at least four sensors spatially separated from each other in a quadrangular arrangement;
placing the at least four sensors in a rectangular arrangement having parallel opposite sides between the sensors, wherein one of the turning axes is parallel to one pair of sides and the other turning axis is parallel to the other pair of sides of the rectangle and the pointer is at the center of the rectangle;
detecting radio signals emitted by said tag with the array of at least two sensors;
determining tag-to-sensor distances between the tag and each sensor;
calculating tag-to-sensor distance differences;
averaging two tag-to-sensor distances along each axis; and
turning the pointer in a direction determined based on the tag-to-sensor distance differences and in a direction that reduces differences between the averages of the tag-to-sensor distances.

2. The method of claim 1, further comprising the steps of using a camera as the pointer;
using computer vision to identify the object of tracking;
using computer vision to track the object while also suspending the step of turning the camera in a direction determined based on the tag-to-sensor distance differences; and
periodically comparing turning directions of the camera with directions that would result from turning the camera in a direction determined based on the tag-to-sensor distance differences and resuming tracking based on tag-to sensor distance differences if the turning directions of the camera contradict the turning directions based on tag-to-sensor distance differences.

3. The method of claim 1, further comprising the steps of using a camera as the pointer;
using computer global positioning sensors to identify a pointing vector between the camera and the object of tracking;
using changes in the direction of the pointing vector to track the object while also suspending the step of turning the pointer in a direction determined based on the tag-to-sensor distance differences; and
periodically comparing turning directions of the camera with directions that would result from turning the camera in a direction determined based on the tag-to-sensor distance differences and resuming tracking based on tag-to-sensor distance differences if the turning directions of the camera contradict the turning directions based on tag-to-sensor distance differences.

4. The method of claim 3, further comprising the steps of:
providing altimeters to determine the altitudes of the camera and the tag;
determining an altitude difference between the camera and the tag;
using the global positioning sensors only to determine a horizontal component of the pointing vector;
using the altitude difference between the pointer and the tag to determine a vertical component of the pointing vector;
panning the pointer based on the horizontal component of the pointing vector; and
tilting the pointer using the vertical component of the pointing vector.

5. An apparatus for cooperatively tracking an object by a pointing device, comprising
the pointing device;
a multiplicity of sensors located at known distances from the pointing device and the multiplicity of sensors are structurally connected to the pointing device by way of a rigid frame that supports at least four sensors located at the vertices of a square with the pointing device located at the center of the square and pointing in a direction perpendicular to a plane consisting of the square, and the multiplicity of sensors are configured to determine their distances from a tag emitting radio signals that may be detected by said sensors;
the tag connected to the tracked object;
a positioner that is configured to orient the pointing device; and
a control device connected to the sensors and to the positioner and configured to compute positioning commands for the positioner based on distances of the sensors from the tag.

6. The apparatus of claim 5, comprising a positioner configured to have two turning axes perpendicular to each other and wherein said turning axes are within the plane consisting of the square and wherein two sides of the square are parallel with each of said turning axes.

7. The apparatus of claim 5, wherein the pointing device is a camera and the control device is connected to the camera and is configured to control focus and zoom of the camera based on distances of the sensors from the tag.

8. The apparatus of claim 7, comprising multiple tags configured to be paired with the controller, and the controller is configured to track tags paired with the controller.

9. The apparatus of claim 7, further comprising a controller that is configured to use image recognition methods to track an object and to switch between object tracking using positioning commands for the positioner based on distances of the sensors from the tag and object tracking using image recognition.

10. The apparatus of claim 7, further comprising global positioning sensors configured to generate location data, said global positioning sensors associated with the tag and the camera, wherein the controller is configured to use location data to track an object and to switch between object tracking using positioning commands for the positioner based on distances of the sensors from the tag and object tracking using location data.

11. An apparatus for cooperatively tracking an object by a pointing device, comprising
the pointing device;
a multiplicity of sensors located at known distances from the pointing device and the multiplicity of sensors are structurally connected to the pointing device by way of a rigid frame that supports three sensors located at the vertices of a perfect triangle and the pointing device located at the center of said triangle and pointing in a direction perpendicular to a plane consisting of the triangle, and the multiplicity of sensors are configured to determine their distances from a tag emitting radio signals that may be detected by said sensors;

the tag connected to the tracked object;

a positioner that is configured to orient the pointing device; and a control device connected to the sensors and to the positioner and configured to compute positioning commands for the positioner based on distances of the sensors from the tag.

12. The apparatus of claim 11, wherein the pointing device is a camera and the control device is connected to the camera and is configured to control focus and zoom of the camera based on distances of the sensors from the tag.

13. The apparatus of claim 12, comprising multiple tags configured to be paired with the controller, and the controller is configured to track tags paired with the controller.

14. The apparatus of claim 12, further comprising a controller that is configured to use image recognition methods to track an object and to switch between object tracking using positioning commands for the positioner based on distances of the sensors from the tag and object tracking using image recognition.

15. The apparatus of claim 12, further comprising global positioning sensors configured to generate location data, said global positioning sensors associated with the tag and the camera, wherein the controller is configured to use location data to track an object and to switch between object tracking using positioning commands for the positioner based on distances of the sensors from the tag and object tracking using location data.

* * * * *